United States Patent [19]
Hashimoto et al.

[11] 3,947,540
[45] Mar. 30, 1976

[54] METHOD FOR CURING TIRES, ESPECIALLY LARGE-SIZE TIRES

[75] Inventors: Mitsuo Hashimoto; Nobuo Kawakami, both of Kodairo; Kazuhiko Nakagawa, Kobe; Yasuhiko Fujieda, Nishinomiya, all of Japan

[73] Assignees: Bridgestone Tire Company, Ltd., Tokyo; Kobe Steel, Ltd., Kobe, both of Japan

[22] Filed: Jan. 14, 1974

[21] Appl. No.: 433,306

Related U.S. Application Data
[63] Continuation-in-part of Ser. No. 192,275, Oct. 26, 1971, abandoned.

[30] Foreign Application Priority Data
Oct. 26, 1970 Japan................................ 45-94974
Oct. 26, 1970 Japan................................ 45-94975

[52] U.S. Cl. ................... 264/326; 264/315; 425/47
[51] Int. Cl.² ........................................... B29H 5/02
[58] Field of Search ........ 264/315, 326; 425/17, 20, 425/25, 29–33, 47, 450.1, 451.1–451.6

[56] References Cited
UNITED STATES PATENTS

| | | | |
|---|---|---|---|
| 2,345,838 | 4/1944 | Soderquist et al. | 425/47 |
| 2,358,763 | 9/1944 | Soderquist | 425/47 |
| 2,498,264 | 2/1950 | Goldhard | 425/247 X |
| 2,808,618 | 10/1957 | Soderquist | 425/33 |
| 3,262,158 | 7/1966 | Von Reimer et al. | 425/451.2 |
| 3,298,066 | 1/1967 | Soderquist | 264/315 X |

*Primary Examiner*—Jan H. Silbaugh
*Attorney, Agent, or Firm*—Oblon, Fisher, Spivak, McClelland & Maier

[57] ABSTRACT

A method for curing tires especially adapted for curing very large-sized or so-called giant tires which have not been generally in such demand as to warrant mass production characterized by holding the curing mold in a stably closed locked condition during the curing process under purely mechanical force in contrast to hydraulic force such as heretofore employed, comprising the steps of placing a mold unit composed of upper and lower mold halves and containing a semi-shaped "green" tire upon a stand of a mechanical press having a plunger mechanism supporting an upper housing member moved by means of a crank gear, driving the crank gear to a first position located ahead of its lower dead center a predetermined amount whereby the plunger mechanism and housing section are smoothly and continuously moved through an arcuate path from a raised position to a lowered position at which the plunger mechanism and housing member are adjacent the upper mold half, adjusting the position of the plunger mechanism relative to the crank gear so that the plunger closely contacts the upper mold half, driving the crank gear to its lower dead center so as to lock the apparatus with an over-center type locking action, and providing the mold unit with a steam atmosphere for the purpose of heating the mold and curing the tire.

5 Claims, 3 Drawing Figures

METHOD FOR CURING TIRES, ESPECIALLY LARGE-SIZE TIRES

CROSS-REFERENCE TO RELATED APPLICATION

This is a continuation-in-part application of application Ser. No. 192,275 filed Oct. 26, 1971, now abandoned.

BACKGROUND OF THE INVENTION

1. Field of the Invention

This invention relates generally to a method of curing tires, and more particularly to such a method of curing tires characterized by holding the curing mold in a stably closed, locked condition during the curing process under purely mechanical force which in one aspect is especially adaptable for curing very large-sized or giant tires.

2. Description of the Prior Art

Large or small-sized tires generally used for cars, trucks or buses are conventionally produced by a composite unit known as a mechanical press which includes a semi-shaping unit and a curing unit, whereby the tires of such sizes are produced in an automatic production line system featuring such processes as semi-shaping, curing and removing the cured tires.

However, very large-sized or giant tires which are used for construction machines, super-heavy trucks or other special vehicles have not generally been in such demand as to require mass production, and therefore, the production of such very large-size or giant tires has not conventionally been placed upon an automatic production line system. Instead, the very large-sized or giant tires for the above-mentioned purposes are generally produced in the following manner. First, a "green" tire, or one which is semi-shaped substantially corresponding to the final shape but not yet cured, is produced in a semi-shaping unit. Then, the semi-shaped tire is placed in a mold unit composed of upper and lower mold halves, and the mold unit containing the semi-shaped tire is carried into a pot heater equipped with hydraulic ram means. In the pot heater, the upper and lower mold halves are pressed together by the hydraulic ram means and perhaps additionally, for security purposes, by means of bolt and nut arrangements with such sufficient force to overcome the strong expansion force exerted in the curing process by the tire-forming materials contained in the mold.

In the curing process, the mold unit is confined in an atmosphere of steam for heating purposes for as long as about 6 to 12 hours, while the inner surface of the tire is supported by a bladder into which hot water is introduced under pressure. After curing, the mold unit is taken out of the pot heater, and the cured tire, including the bladder therein, is removed from the upper and lower mold halves. Finally, the tire is again processed in the semi-shaping unit so as to remove the bladder therefrom. The series of processes described herein and conventionally used for curing very large-sized or giant tires are not performed automatically.

However, a remarkable increase in the demand for such very large-sized or giant tires in recent years has pushed forward the requirement that very large-sized or giant tires also be mass produced with the same high efficiency previously realized in the production of large and small-sized tires.

When very large-sized or giant tires are produced in the conventional method described above, there is a serious disadvantage, other than that the conventional method is not readily suitable for an automatic mass production system, which is that it sometimes is difficult to keep the mold halves containing the tire-forming materials in perfectly closed condition for a long period of time, such as between 6 and 12 hours, against the strong expansion force exerted by the materials. This is because, in the conventional method wherein the mold halves are pressed together by a hydraulic ram means, there is a danger that the pressing force of the ram may be unexpectedly lowered or lost due to a failure of the electric power or a damage in the electric system, or due to a leakage of hydraulic fluid in the sealing portions of the ram cylinder or valves.

If a lowering or loss of the ram hydraulic pressure occurs during the curing process, the tire-forming materials contained in the mold unit will leak out of the mold through the joining portion of the mold halves, whereby the product is degraded and is below standard such that it cannot be used. Such failure in the producing process of very large-sized or giant tires results in serious loss, since such tires are generally very expensive. To prevent accidental damage of the character described from occurring, attempts have been made to clamp the upper and lower mold halves by bolts and nuts, in addition to the hydraulic ram means, but this clamping work is heavy, difficult, and expensive, and nevertheless, it cannot perfectly accomplish the purpose of keeping the mold unit in a satisfactory tightly closed condition in the case of failure of the ram hydraulic pressure.

Further, there is the fear that operators are exposed to dangerous situations caused by the loosening of these bolts and nuts during the production process, and a still further disadvantage of the conventional method of employing hydraulic ram means is that it requires a number of pumps and valves, and therefore, the maintenance of the equipment is relatively expensive.

SUMMARY OF THE INVENTION

Accordingly, it is a primary object of the present invention to provide a method for curing tires, especially very large-sized or giant tires which have not been generally in such demand as to warrant mass production, by maintaining the curing mold in a stably closed locked condition during the curing process under purely mechanical force which is free from such unexpected lowering or loss of force which might inadvertently occur in a hydraulically operated pressure-applying system.

Another object of this invention is the provision of a method of curing tires having simple preparatory procedures and being free of the dangers in such prior methods wherein bolts and nuts are used for securing the molds.

Still another ojbect of the present invention is to provide a method for curing tires which exhibits preparatory conditions capable of maintaining the mold unit under a stable force condition in the instance that the shapes or sizes of the various mold units are respectively displaced corresponding to the shapes or sizes of the tires to be cured therein.

Yet another object of the present invention is to provide a method for curing tires by which automatic operations result in achieving preparatory conditions which facilitate accommodation for differences among the various mold units.

A further object of the present invention is the provision of a method for curing tires by which a substantially large force may be firmly and safely applied to the mold unit so as to cure the tires therein in consideration of overloads and the elasticity thereof.

The foregoing and other objects are attained according to the present invention through the provision of an apparatus featuring a mold unit composed of upper and lower mold halves for receiving a semi-shaped "green" tire of giant proportions therebetween, a mechanical press having a stand for receiving the mold unit from outside the apparatus, a housing on the press for sealingly enclosing the mold unit for providing a steam chamber for curing a tire and having a movable upper member and a fixed lower member, a crank gear on the press for driving the upper housing member reciprocally in a vertical path, means for driving the crank gear, plunger means on the upper housing member having coaxially disposed members axially displaceable relative to one another for automatically pressing the mold unit, geared motor means for operating the plunger means through a coupling means for axially displacing the plunger members, control means for shutting off the power supply to the geared motor means and for energizing the means for driving the crank gear responsive to the coupling means being loaded beyond a predetermined level, first limit switch means for de-energizing the means for driving the crank gear and for energizing the geared motor means for actuating the plunger means for applying mechanical pressure to the mold unit when the upper housing member is in a first position just in advance of the lower dead center of the vertical path thereof, and second limit switch means for de-energizing the means for driving the crank gear when the upper housing member is in a second position situated in the lower dead center of its vertical path.

Thus, according to the apparatus of this invention as characterized herein, the objects of this invention may be attained by a method of placing the mold unit composed of the upper and lower mold halves containing a semi-shaped "green" tire therein upon the stand of the mechanical press having the plunger mechanism supporting the upper housing member moved by the crank gear, driving the crank gear to a first position located ahead of its lower dead center a predetermined amount whereby the plunger mechanism and the housing member are smoothly and continuously moved through an arcuate path from a raised position to a lowered position at which the plunger mechanism and housing member are adjacent the upper mold section, adjusting the position of the plunger mechanism relative to the crank gear so that the plunger closely contacts the upper mold half, driving the crank gear to its lower dead center so as to lock the apparatus with an over-center type locking action, and providing the mold unit with a steam atmosphere for the purpose of heating the mold and curing the tire.

The relative position of the plunger to the crank gear may be adjusted so that the plunger closely contacts the upper mold half, through the geared motor means for rotating the plunger means through the coupling means for thereby axially displacing the plunger members and the control means for cutting off the power supply to the geared motor means and for energizing the means for driving the crank gear responsive to the coupling means being loaded beyond a predetermined level are provided in the apparatus. Though, generally speaking, it is difficult for a mechanical press to control such large forces generated by the crank gear, the geared motor means and the control means of this invention protect the apparatus from being overloaded and also prevent it from loosening because of the inherent elasticity thereof.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like referece numerals designate like or corresponding parts throughout the several views, and wherein.

DESCRIPTION OF A PREFERRED EMBODIMENT

Figure 1:
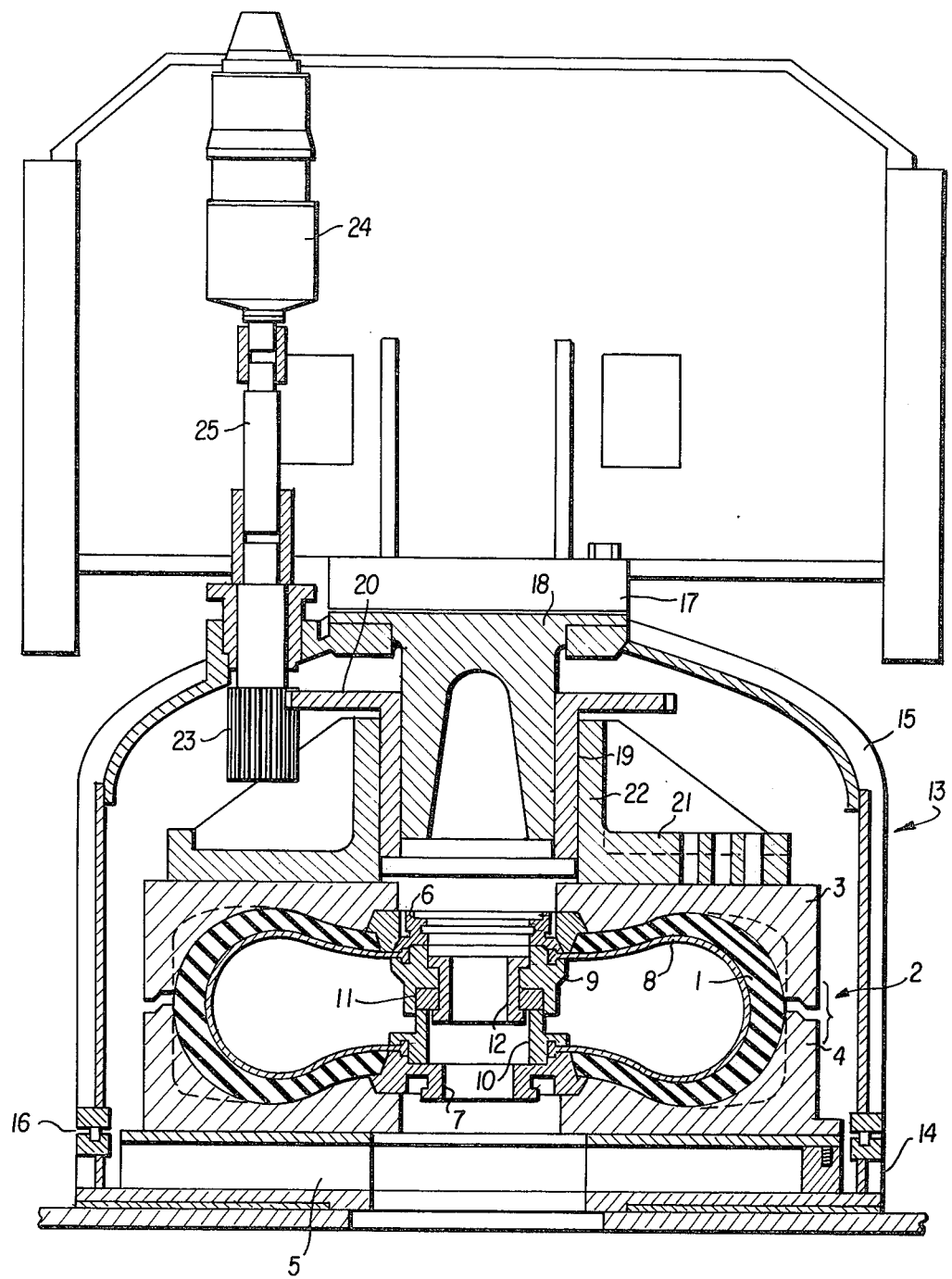
FIG. 1 is a vertical section of a mechanical press particularly adapted to perform the method of this invention, showing especially the manner in which the mold halves are held between a stand and a mechanical plunger of the press.

Referring now to the drawings, and more particularly to FIG. 1, a semi-shaped and not yet cured, or a "green" tire 1, which has been produced in a conventional semi-shaping unit, not shown, is placed in a mold unit generally designated by reference numeral 2 composed of upper and lower mold halves 3 and 4, and the mold unit 2 is placed upon a stand 5 of the press. Before the tire 1 is placed in the mold, the bead portions of the tire are confined by upper and lower bead rings 6 and 7, respectively, and over the entire inside surface of the tire there is placed in contact therewith a bladder 8, the inside peripheries of which are fluid-tightly closed by cylindrical packing means composed of mutually engaged bladder rings 9 and 10, which in turn are engaged with the upper and lower bead rings 6 and 7. The rings 9 and 10 are fluid-tightly engaged via a packing ring 11 and are assembled by a locking element 12. As it is seen in FIG. 1, the upper and lower mold halves 3 and 4, being assembled as the mold unit 2 containing the semi-shaped tire and placed on the stand 5 of the press, are not yet in contact with each other to close the mold, but the upper mold half 3 is suspended above the lower mold half 4 a relatively large distance, such as about 50 mm., when no clamping force is applied to the mold halves.

The mold unit 2 placed on the stand 5 of the press is covered by a housing 13 adapted to provide a steam box in which the mold unit is subject to a steam heating atmosphere during the curing process of the tire. The housing 13 includes a lower housing member 14 mounted on the stand 5 and a bell-shaped upper housing member 15, both being adapted to join fluid-tightly with each other at the peripheral portion thereof with interposition of a packing ring 16. The upper housing 15 is supported by a plunger body 17, which in turn is movably supported by a crank gear as will be described in detail hereinbelow.

The plunger body 17 carries a first plunger element 18 formed as a columnar member being threaded on its outer periphery. The plunger element 18 carries a second element 19 also formed as a tubular member and having threaded inner and outer surfaces, whereby the second plunger element 19 is threadably engaged on the outside of the first plunger element 18 by the cooperating threads. The element 19 has a flanged portion 20 formed as a gear wheel which is adapted to be driven by a pinion to be described. A third plunger element 21 is carried by the tubular plunger element 19 having a flange on the lower surface thereof to contact the upper mold 3 and a tubular portion 22 extending centrally and vertically upward therefrom which is threaded inside to engage with the outer threads of the second plunger element 19. The threads on the inside and outside surfaces of the element 19 are spiralled in opposite directions so that rotation of the element 19 causes axial displacement of the third element 21 relative to the first element 18, provided that rotation of the third element 21 is prevented by a suitable axial guide means, not shown.

The gear wheel 20 on the element 19 is in meshing engagement with a relatively elongated vertically oriented pinion 23 rotatably carried by the plunger body 17 and adapted to be driven by a geared motor 24 via suitable coupling means 25.

Figure 3:
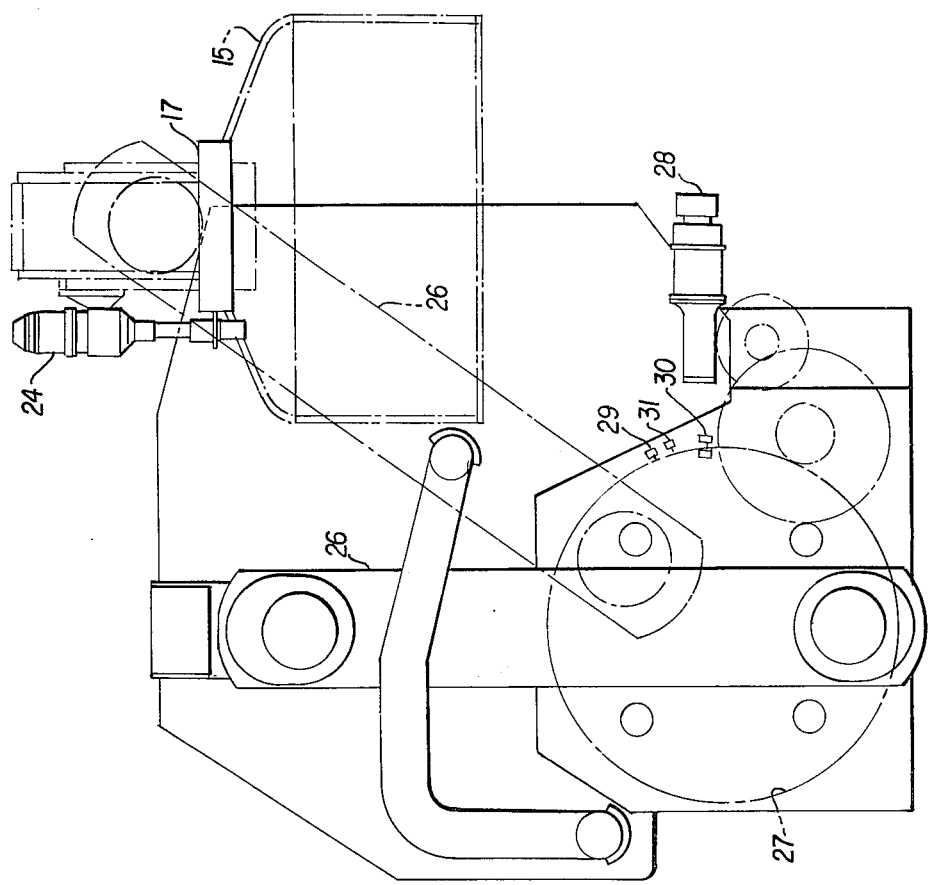
FIGS. 2 and 3 are a vertical section and a side view, respectively, of the mechanical press shown in FIG. 1, showing especially the manner in which the mechanical plunger mechanism and the upper housing section are smoothly and continuously moved through an arcuate path by means of the crank gear assembly from the raised position shown in chain lines in FIG. 3 to the lowered position shown in FIG. 2.
Figure 2:
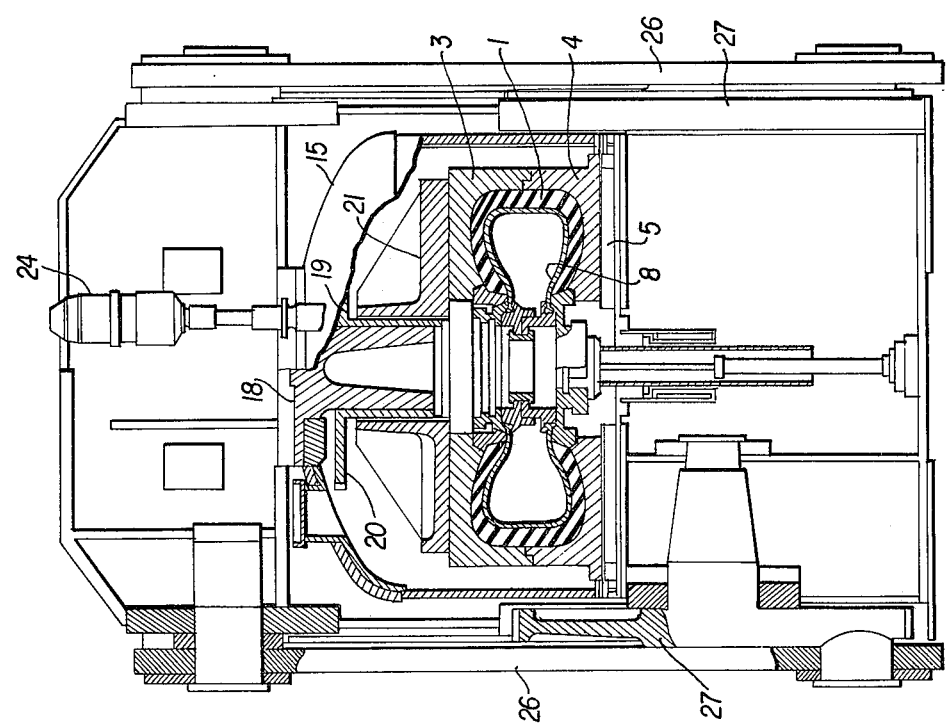

Referring now to FIGS. 2 and 3, the plunger body 17 is shown being carried by a crank gear including a pair of parallel crank arms 26 and a corresponding pair of crank wheels 27. The crank arms 26 take the position shown by solid lines in FIG. 3 when they are at their lower dead centers, wherein the plunger body 17 is lowered and the upper housing member 15 is also lowered to define a steam box together with the lower housing member 14, and take the position shown by dash-and-dot lines in FIG. 3 when they are in the raised position for opening the steam box and lifting the plunger for charging or discharging a mold unit into or out of the press.

In curing the "green" tire 1, which is set with the bladder 8 and upper and lower bead rings 6 and 7, and placed between the upper and lower mold halves 3 and 4, the crank wheels 27 are first turned to bring the crank arms 26 to the position shown by dash-and-dot lines in FIG. 3, whereby the plunger body 17 is lifted and the region over the stand 5 of the press is widely opened to be ready for charging the mold unit containing the "green" tire. After the mold unit has been carried onto the stand 5 by means of, for example, a crane, and settled at the central region thereof preferably by means of suitable devices, not shown, the bladder 8 is connected to a pressure source by suitable fluid conducting means, not shown, so as to be inflated with a pressure of about 1 kg/cm². Then, the crank wheels 27 are driven by a motor 28 through suitable power transmission lines until a limit switch 29 is actuated thereby to deenergize the motor 28 and stop the crank wheels at a position just in advance of their lower dead centers. Consequently, the plunger mechanism 17 and the upper housing section 15 carried thereby are smoothly and continuously moved through an arcuate path from the raised position shown by the dash-and-dot lines of FIG. 3 to the lowered position 1 at which the upper housing is adjacent the lower section 14.

With the crank wheels and arms being held in this position, the geared motor 24 is energized to rotate the tubular plunger element 19, whereby the plunger element 21 is gradually lowered until it comes in tight contact with the upper mold half 3. When the plunger element 21 tightly contacts the upper mold half 3, the coupling means 25 are loaded beyond a predetermined level, whereby the power supply to the motor 24 is automatically cut off by appropriate control means of conventional character, not shown. By the actuation of this control means, the motor 28 is again energized and the crank wheels 27 are driven to their lower dead centers, where another limit switch 30 is actuated and the motor 28 is again automatically deenergized.

Movement of the crank wheels 27 from the previously descirbed first stop position to the lower dead centers causes the plunger body 17 to be pulled down with a relatively strong force being exerted by the crank wheels near their dead centers, through means of an over-center locking type action, whereby the upper mold half 3 is pressed down against the lower mold half 4 by a correspondingly strong force. Thus, the upper and lower mold halves 3 and 4 are tightly closed to confine the "green" tire contained therein. Since, in this case, the plunger body 17 is positively held in a lowermost clamping position by the crank arms 26 being positioned stand-still at their lower dead centers with no further need of the power supply, there is no danger that the clamping force will be lowered or lost unexpectedly due to a failure of the electric or other power sources.

By the plunger body 17 being lowered to its lowermost clamping position corresponding to the dead center of the crank wheels 27, the bell-shaped upper housing member 15 also comes in close contact with the lower housing member 14 to define the steam box around the mold unit. Steam may then be introduced into the steam box by any suitable conduit means, not shown.

After the lapse of a predetermined time of curing, the processes described above are performed in a reverse order to reveal the mold unit 2 now containing the cured tire on the press stand and being ready to be carried out of the press by means of a crane or the like through a widely open space provided above the stand.

The extent of clamping to be exerted on the mold unit differs according to the dimensions, as well as the kind, of tire to be cured. This extent can readily be adjusted by positioning the limit switch 29 along the periphery of the crank wheel or by providing second, third and other limit switches such as the one which is shown in FIG. 3, being indicated by the numeral 31.

From the foregoing, it will be appreciated that the method and apparatus of curing tires according to this invention is highly suitable for production of very large or giant-sized tires in view of the fact that the method and apparatus may be readily performed and operated in a fully automatic manner. Furthermore, the preparatory conditions with accommodation to differences in size among the various mold units, that is, the adjustable positions of the plunger relative to the crank gear whereby the plunger is able to closely contact the upper mold half, is always attained by the geared motor and control means of the present apparatus for curing tires constructed according to this invention, whereupon firm and stable forces may be impressed upon the curing tire without deleterious over-loading and with consideration for elasticity within the apparatus.

Obviously, many modifications and variations of the present invention are possible in light of the above teachings. Accordingly, it is to be understood that within the scope of the appended claims, the invention may be practiced otherwise than as specifically described herein.

What is claimed as new and desired to be secured by letters patent of the United States is:

1. A method of curing tires comprising the steps of:

placing a mold unit, composed of upper and lower mold halves and containing a semi-shaped green tire, upon a stand of a mechanical press having a plunger mechanism supported, and capable of being moved by means of crank gear wheels and arms;

driving said crank gear wheels and arms to a first position located just ahead of their lower dead center position by a predetermined amount so as to continuously and smoothly move said plunger mechanism in an arcuate fashion from a raised position to a lowered position at which said plunger mechanism is located adjacent said upper mold half;

adjusting said plunger mechanism relative to said crank gear wheels and arms so that said plunger mechanism contacts and pressurizes said upper mold half with a compressive force and is loaded beyong a predetermined level, whereby said upper mold half is forced into contact with said lower mold half;

driving said crank gear wheels and arms to their lower dead center position so as to stress and compress said upper mold half still further into contact with said lower mold half through means of said plunger mechanism and thereby achieve an overcenter type locking action; and surrounding said mold unit with a steam atmosphere for the purpose of heating the mold and curing the tire.

2. A method of curing tires, especially very large-sized or giant tires which are not in such demand as to warrant mass production by a mechanical press for pressing a mold unit composed of upper and lower mold halves and containing a semi-shaped green tire which has a stand, crank gear wheels and arms secured to said stand, a lower housing member fixed upon said stand, an extensible plunger mechanism supported by said crank gear, wheels and arms, and an upper housing member supported by said plunger mechanism, comprising the steps of:

placing said mold unit upon said stand, driving said crank gear wheels and arms to a first position located just ahead of its lower dead center so that said upper housing member will mate with said lower housing member so as to enclose said mold unit for providing a steam chamber for curing said tires;

extending said extensible plunger mechanism so that said extensible plunger mechanism applies mechanical pressure to said upper mold half, and is loaded beyond a predetermined level so as to compress the same into contact with said lower mold half while said crank gear wheels and arms remain in said first position;

driving said crank gear wheels and arms to the lower dead center so as to stress and compress said upper mold half still further into contact with said lower mold half, through means of said plunger mechanism, so as to attain a locking action therewith; and surrounding said mold unit with a steam atmosphere for heating said mold unit and curing said tire.

3. A method according to claim 2, further comprising adjusting said predetermined amount by which said plunger is located above its lower dead center at said first position according to the dimensions and kind of tire to be cured.

4. A method according to claim 2, wherein said adjusting of the relative position of said plunger to said crank gear is effected by mechanically changing the length of said plunger.

5. A method according to claim 2, further comprising opening and closing said steam atmosphere by operating said crank gear.

* * * * *